July 28, 1925. 1,547,594
A. V. LEGGO
ROASTING FURNACE
Filed Dec. 22, 1921  2 Sheets-Sheet 2

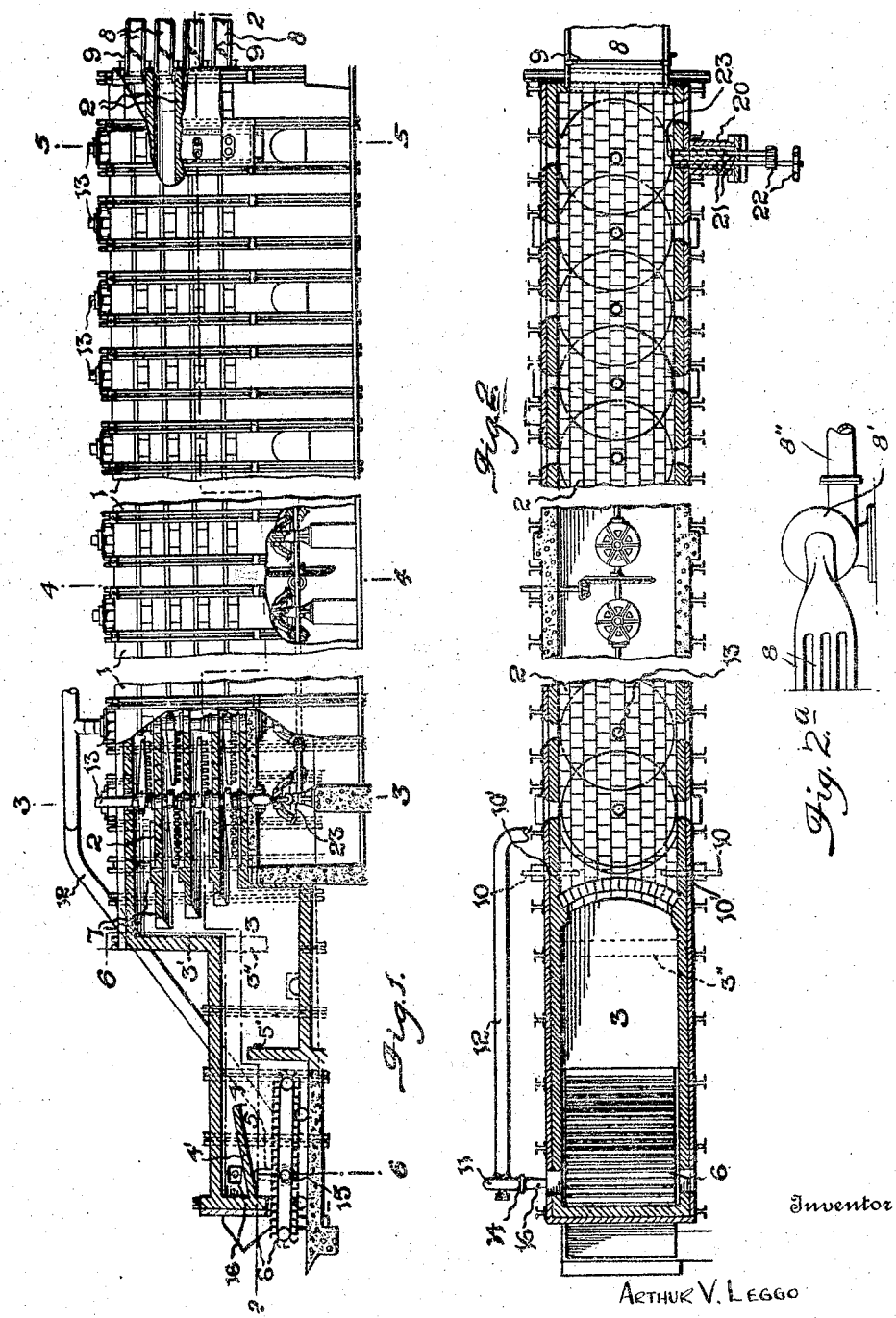

INVENTOR:
ARTHUR V. LEGGO.
by Spear, Middleton, Donaldson & Hall
Attys.

Patented July 28, 1925.

1,547,594

UNITED STATES PATENT OFFICE.

ARTHUR VICTOR LEGGO, OF MELBOURNE, VICTORIA, AUSTRALIA.

ROASTING FURNACE.

Application filed December 22, 1921. Serial No. 524,301.

*To all whom it may concern:*

Be it known that ARTHUR VICTOR LEGGO, subject of the King of Great Britain, residing at 497 Collins Street, Melbourne, in the State of Victoria, Commonwealth of Australia, has invented certain new and useful Improvements in Roasting Furnaces, of which the following is a specification.

This invention relates to improvements in roasting furnaces and refers especially to multiple hearth "straight line" furnaces for the treatment of ores and other materials or substances.

In the past "straight line" superimposed hearth roasting furnaces have usually been constructed with the roasting chambers arranged in communication with each other and having rabbling mechanism operating therein to convey all the material over each hearth and drop it from one hearth to another so that it passes in a zig-zag manner over all the hearths of the furnaces.

In this form of furnace heat was supplied from a fire box located at the discharge end of the lowermost hearth and sometimes the heat was augmented by locating auxiliary fireboxes at the ends of one or more of the superimposed hearths.

One of the disadvantages experienced with the above type of furnace was the great amount of flue dust occasioned by dropping the finely divided material being treated from one hearth to another, the dust produced being carried off by the draught through the furnace and resulting in considerable waste.

A further disadvantage incident to this design of furnace is that it was very limited in capacity by the fact that all the material and all the gases had to pass over each hearth and if the arches were raised to give more passage for the gases and greater capacity the metallurgical efficiency was impaired.

The disadvantages of single hearth straight line furnaces are the relatively great cost of construction for their hearth area, the great loss of heat by conduction and radiation, the large area of floor space necessary and the consequent heavy cost of operating them.

The disadvantages experienced with roasting furnaces constructed and operating as above described led to the devisal of a "straight line" furnace with a plurality of separate and independent superimposed hearths having means for supplying ore to each and for conveying it simultaneously along all the hearths in the same direction and at the same rate of speed and for discharging the roasted or treated ore from each of the hearths.

Each of the roasting hearths had a firebox located at its discharge end to supply the requisite heat for ensuring a proper treatment of the ore passing thereover and in order to compensate for the greater loss of heat from the upper and lower hearths their fire boxes were made greater in dimension than the fire boxes for the intervening hearths.

The last mentioned design of furnace gave a very efficient roast and was capable of treating large quantities of ore in a given time and overcame the "dusting" occasioned by dropping the ore from one hearth to another and enabled the arch over each hearth to be kept low enough to give good metallurgical results.

In order to ensure the furnace operating at full capacity and at a maximum efficiency a uniform amount of ore had to be passed simultaneously and at the same rate of speed over all the different hearths and at the same time be subjected to uniform roasting conditions at all corresponding points in the lengths of the different hearths.

Whilst providing greater capacity and efficiency than the earlier types of multiple hearth straight line furnaces, the last mentioned form of furnaces did not operate economically under all circumstances.

The chief disadvantage incident to this type of furnace was the difficulty experienced in maintaining the necessary uniform temperature throughout all of the hearths to ensure a satisfactory product and the amount of labour and the care necessary on the part of an attendant to ensure the correct proportion of heat being maintained in the fire boxes at all times.

If the heat in any one fire box were allowed to fall off, the unroasted or partly roasted product from its respective hearth was liable to poison the whole output for subsequent treatment and thus metallurgical efficiency depended upon maintaining all of the fires at proper heat.

The present invention relates to multiple independent hearth roasting furnaces and has for its salient object the provision of simple and thoroughly efficient means whereby the above mentioned disadvantages are entirely eliminated and uniformity heated gases can be supplied automatically to the different roasting chambers so that the ore passing over all the hearths will be subjected to the same roasting conditions and a uniform product thereby obtained. Moreover, the same means enables an attendant to vary the temperature and oxygen content of the gases and the rate of the flow of the said gases over the hearths so as to effectively control the reaction in every part of the furnace and thereby obtain the best metallurgical results consistent with economy from the material under treatment in the furnace at the time. The means for effecting the above mentioned objects permit of the various factors which govern the reactions in the furnace being controlled independently thereby providing great flexibility and adaptability for dealing with changes in the class of material under treatment or variations from normal in the condition of the furnace.

A further object of the invention resides in the provision of improvements in the means for feeding ore to the hearths and in the means employed to stir and expose every particle of the ore to the furnace gases while it is being conveyed along the said hearths.

I accomplish the above mentioned objects by equalizing the temperature and chemical composition of the roasting gases by passing them at controllable pressure through an equalizing chamber interposed between the source of gas supply and the roasting chambers. More particularly the means for effecting an equalization of the temperature and chemical composition of the gases consist in arranging the discharge ends of the roasting chambers in communication with an equalizing and mixing chamber of suitable dimensions which may have a baffle wall depending from the roof thereof and in passing the gases heated by combustion of fuel, together with any extra air required to the equalizing chamber and beneath the baffle wall therein (when same is used) before forcing them in equal or predetermined volumes into and through the roasting chambers which may have a regulated draught at their feed ends.

By varying both the amounts and proportions of the air and of the gases of combustion forced into the equalizing chamber and at the same time regulating dampers at the entrances to and exits from the roasting chambers, the gases therein may be varied as required in temperature, oxygen content, rate of flow and pressure, and any one or more of these factors can be controlled without affecting the others.

The air forced into the combustion chamber for maintaining a desired pressure in the equalizing chamber preferably is preheated by first drawing it through the hollow rabble shafts located in the hotter part of the furnace.

The improvements in the means for feeding the ore to the hearths comprise a hopper having an upwardly tapering outer wall and feed screws for conveying the ore therefrom to the hearths, and this construction serves to provide an ample supply of ore to all the hearths at all times and irrespective of the condition of the ore.

In order that the invention may be readily understood reference will now be had to the annexed sheets of explanatory drawings wherein:—

Figure 1 is a view in side elevation partly in section of a furnace embodying improvements in accordance with the present invention, parts being shown broken away for convenience of illustration.

Figure 2 is a view in sectional plan taken on the dotted line 2—2 of Figure 1.

Figure 2$^a$ is a view of draft producing means detached from the feed end of the furnace and drawn to a smaller scale than Figures 1 and 2.

Figures 3, 4:
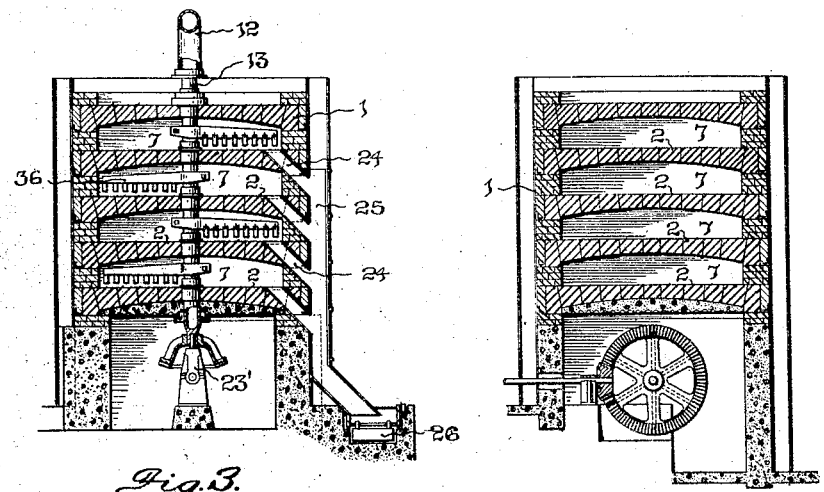

Figure 3 is a view in sectional end elevation taken on the dotted line 3—3 of Figure 1.

Figure 4 is a view in sectional end elevation taken on the dotted line 4—4 of Figure 1.

Figures 5, 6:
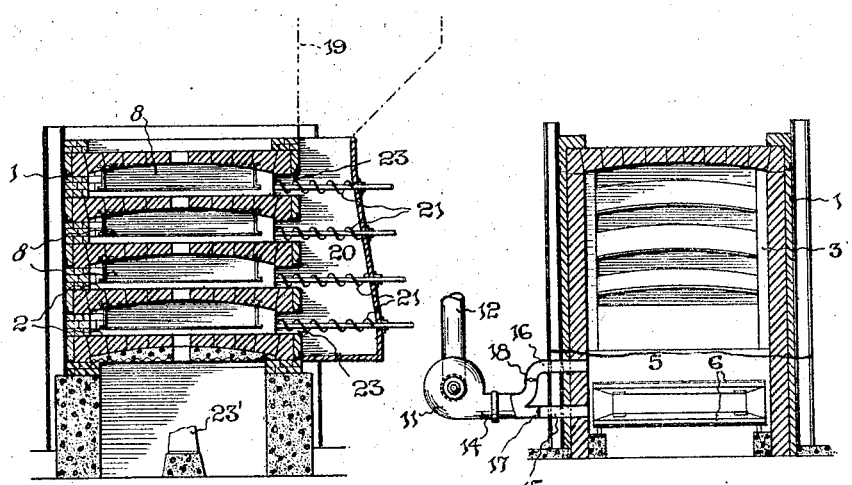

Figure 5 is a view in sectional end elevation taken on the dotted line 5—5 of Figure 1.

Figure 6 is a view in sectional end elevation taken on the dotted line 6—6 of Figure 1.

Figures 3, 4, 5, and 6 have been drawn to a slightly larger scale than Figures 1 and 2.

In these drawings the numeral 1 designates the furnace which is formed with a plurality of superimposed independent hearths 2 which extend from the feed end thereof to a large equalizing chamber 3 located adjacent to the discharge ends of the hearths and preferably built into the furnace.

The equalizing chamber 3 is arranged in communication with a combustion chamber 4 of a fire box 5 provided with a mechanical stoker 6 or with an ordinary fire grate as preferred. In lieu of providing the combustion chamber with a stoker or grate as shown in the drawings, any form of fuel burner may be used to supply the requisite heat with any suitable modification in the construction of the combustion chamber.

The heating gases generated in the combustion chamber pass therefrom over a bridge and into the equalizing chamber preferably at a point level with or below the level of the lowermost roasting chamber.

The roof of that end of the equalizing chamber which is disposed nearest the fire box 5 can be formed in line with the roof of the combustion chamber and the roof of the opposite end of the said equalizing chamber can be arranged on the same level as and be formed as a continuation of the arch of the uppermost roasting chamber.

The discharge ends of the hearths project into the equalizing chamber and in their order upward they extend progressively nearer the wall 3' of the said equalizing chamber which passes more or less vertically from the lower to the higher roof. By arranging the discharge ends of the hearths in the equalizing chamber as above described the area of the openings from the said chamber to the different roasting chambers decrease in size in their order upward and the variation in the sizes of the said openings combined with the draught through the roasting chambers and the echelon order of the hearths serves to ensure a desired distribution of the heating gases to all the said roasting chambers.

As the natural tendency of the heated gases is to rise some of the gases will impinge on the projecting ends of the hearths and they will be deflected readily into the roasting chambers beneath even if the pressure within the equalizing chamber is only slight. The discharge end of the lowermost hearth may be arranged flush with the back wall of the equalizing chamber and in lieu of giving the discharge ends of the remaining hearths an echelon formation they can all be arranged in the same vertical plane.

The front wall 3' of the equalizing chamber can be extended downwardly below the roof of the front part of the said chamber as shown in dotted lines at 3'' in Figure 1 of the drawings. This depending part of the front wall forms a baffle which will direct the heating gases in such a way as to ensure a more even mixing of the same when delivered to the equalizing chamber at low pressure to better enable certain metallurgical operations to be performed. When a depending baffle as 3'' is used to aid in the mixing of the heating gases it can in some instances be made of chequer brickwork or provided with openings which are smaller in area as they are postioned nearer the roof of the equalizing chamber.

The construction and arrangement of the equalizing chamber and the parts therein as shown in the drawings will be found very efficient and it will be obvious that it can be modified in certain cases to give greater efficiency when carrying out particular metallurgical operations.

A deflecting or ignition arch 4' extends from the front of the combustion chamber to a desired distance over the mechanical stoker and this arch serves to deflect the gases of combustion back toward the equalizing chamber and when heated facilitates the ignition of the fuel and the complete combustion of the gases. The hotter gases are thrown down somewhat by the deflecting arch 4' and thereby are brought into more intimate contact with any cooler gases which may pass over the bridge 5' with the result that the temperature of the gases passing to the equalizing chamber are brought more into uniformity. The ignition arch 4' can incline as shown in the drawings or it can be built parallel to the top of the grate as preferred.

The bridge 5' at the rear of the fire box can be constructed as shown in Figure 1 or it can be extended upwardly or shortened as may be required.

The roasting chambers 7 located above the hearths 2 open directly into the equalizing chamber 3 and where required their feed ends are connected by flues 8 to a stack or other draught producing means. The flues 8 are provided with valves 9 for regulating the amount of heated gases and fumes passing therethrough and the draught or flow of gases through the roasting chambers is regulated also by means of tiles or dampers 10 (shown in dotted lines) which are inserted in holes 10' formed in the side walls of the furnace so as to restrict the passages leading from the equalizing chamber 3 to the said roasting chambers.

The draught may be effected by means of a fan 11 which is adapted to draw heated air through a pipe 12 from the top of those hollow rabble shafts 13 which are located in the hotter part of the furnace. The lower ends of the rabble shafts are supported in foot-step bearings 23'. The fan is fitted with an outlet pipe 14 having two branch pipes 15 and 16 one of which is arranged to direct heated air to one or more points below the grate in the fire box and the other is arranged to direct heated air to the chamber above the grate. The branch pipe 16 preferably is arranged to deliver heated air between the ignition arch 4' and the roof of the combustion chamber thereabove and the admission of the air at this point serves to ensure it being brought instantly to a very high temperature and to prolong the life of the arch by preventing it becoming overheated.

Valves 17 and 18 are placed in the branch pipes leading under and over the grate to direct and control the amounts and proportions of air delivered over and under the grate respectively.

In the drawings the pipe 12 and branch pipes 15 and 16 are shown delivering air to one side only of the fire box but in practice it will be found advantageous to duplicate these pipes and deliver air to both sides and if desired to the front of the fire box.

The pressure of the heated gases supplied to the equalizing chamber 3 preferably is slightly in excess of the pressure necessary to supply and maintain the volume of gases passing through all the roasting chambers, and this extra pressure facilitates the control and maintenance of the draught through the furnace.

In order to ensure a thorough mixing of the heating gases in particular cases the equalizing chamber can be provided with a baffle wall as 3″ or its equivalent arranged so that the said gases will be directed through a course level with or lower than the discharge end of the lowermost hearth before being passed to the roasting chambers.

The gases heated by the combustion of the fuel in the fire box pass together with any extra air required into the equalizing chamber 3 and the dimensions of said chamber and the course taken by the heated gases ensure the equalization of the temperature and chemical composition of the gases before they are forced into the roasting chambers.

The bottom of the equalizing chamber is preferably situated below the bottom hearth of the furnace and this arrangement and the time during which the gases remain within and the manner in which they are directed through the said equalizing chamber ensures a more or less even mixing of the gases throughout the whole volume thereof so that each roasting chamber automatically receives gases uniform in temperature and chemical composition and the effect of the friction of the moving gases or ash on the floor of the equalizing chamber will not prejudice the supply of hot gases to the lowermost hearth.

The temperature and oxygen content of the gases in the equalizing chamber can be varied as required by regulating the valves 17 and 18 in the branch pipes 15 and 16 so as to pass more or less air below or above the grate in the fire box as may be required. The rate of flow of the heated gases through the roasting chambers can be varied by adjusting the pressure of the gases within the equalizing chamber and regulating the dampers at the entrances and the valves at the exits of the said roasting chambers.

The minus pressure at the feed end of the furnace may be created by a fan 8′ arranged in communication with the flues 8, as shown in Figure 2ª of the drawings, or by the draft of a stack to which the flues are taken in the ordinary way. The fan 8′ may be connected to the stack by means of the flue 8″.

The plus pressure in the equalizing chamber combined with the draught through the furnace or minus pressure at the feed end thereof causes the heated gases to be thrown well back into the roasting chambers and thereby enables more efficient treatment of the ore to be effected.

The plus pressure at the discharge ends of the roasting chambers enables a correspondingly lower minus pressure to be employed at the feed ends to move the roasting gases therethrough and in consequence the amount of "false" air drawn in at any point in the length of the roasting chambers through openings caused by imperfections of structure is reduced to a minimum.

Moreover, the pressure in the roasting chambers can be controlled as desired by regulating the valves 17 and 18 and by adjusting the dampers at the entrances thereto and the exits therefrom to permit of drawing a required amount of outside air into the furnace at any point or points in the length thereof.

The advantage of providing means for controlling the temperature and oxygen content, rate of flow and pressure of the gases independently is that each of these factors can be brought to its optimum value without varying the others from their optimum values. Furthermore, the effective control provided by the present invention enables the best metallurgical results consistent with economy to be obtained from the ore under treatment at the time and in addition the independent controls of the various factors which influence the reactions in the furnace provide great flexibility and adaptability for dealing with changes in the class of ore treated or variations from normal in the condition of the furnace.

The ore to be treated is delivered to a superposed supply hopper 19 (part of which is shown in dotted lines in Figure 5) and gravitates therefrom to a hopper 20 located at the side of the feed end of the furnace. The outer wall of the hopper 20 inclines outwardly from the top toward the bottom so as to gradually increase in width in a downward direction and a plurality of twin feed screws 21 pass horizontally therethrough. The spindles of the feed screws are driven by any approved form of gearing 22 and are adapted to convey ore at a predetermined rate of speed from the hopper 20 through ports 23 in the side walls of the furnace, to the different hearths thereof. If desired the feed screws can be driven at different rates of speed to cause a greater or lesser quantity of ore to be passed to one or more of the hearths than is supplied to the others. Other hoppers similar to 20 can be placed on the opposite side of the furnace at the feed end for delivering to one or more of the hearths material which it is desired to keep separate from the material treated simultaneously on the other hearths. The hoppers 20 can be constructed to permit of their removal so that access can be had to the rabbling mechanism adjacent thereto.

The ore delivered to the hearths is carried therealong to the discharge end and thoroughly stirred by teeth fitted to rabble arms supported on rotatable shafts passing upwardly through the centre line of the furnace.

When the ore has been carried to the discharge ends of the hearths 2 it is directed into the upper ends of inclined branch chutes 24 which are connected to a main discharge chute 25 adapted to deliver onto a push conveyor 26 or to any other desired point. A separate discharge system can be fitted on the opposite side of the furnace to keep any material which has been treated on a particular hearth or hearths separate from that treated on any of the other hearths.

I claim:—

1. In roasting furnaces having a plurality of independent superimposed roasting chambers, the production of a large volume of heated gases, passing the said gases under pressure through an equalizing chamber communicating with the discharge ends of the roasting chambers whereby the said gases are rendered uniform in temperature and composition, and forcing the said gases from the equalizing chamber into the discharge ends of all of the roasting chambers.

2. A roasting furnace having a plurality of independent superimposed roasting chambers, means for supplying ore to each roasting chamber, shafts passing through the centre of all the hearths and fitted with arms for conveying the ore simultaneously through all the roasting chambers, means for discharging the ore from the roasting chambers, a large equalizing chamber having its floor located below the lowermost roasting chamber and arranged in communication with all the roasting chambers, and means for passing gases heated by combustion and air under pressure through the equalizing chamber to said roasting chambers.

3. In roasting furnaces having a plurality of independent superimposed roasting chambers provided with means for conveying material therethrough simultaneously and in the same direction, a combustion chamber, an equalizing chamber disposed interjacent and arranged in communication with the combustion chamber and all of the roasting chambers, and a baffle in the equalizing chamber for directing all the heated gases flowing therethrough from the combustion chamber to a point below the level of the lowermost roasting chamber before passing them to the said roasting chambers.

4. In roasting furnaces having a plurality of independent superimposed roasting chambers, means for generating under pressure a large volume of heated gases in proximity to the discharge ends of the roasting chambers, means for regulating the temperature and oxygen content of the gases, and means for effecting a draught through the roasting chambers whereby the heated gases will pass automatically and at a uniform temperature and composition to and through all of the roasting chambers.

5. In roasting furnaces having a plurality of independent superimposed roasting chambers provided with means for conveying material therethrough simultaneously and in the same direction, a combustion chamber, an equalizing chamber disposed interjacent and in communication with the combustion chamber and the discharge ends of all of the roasting chambers, means for regulating the sizes of the passages of communication between the equalizing chamber and the roasting chambers, means for inducing a minus pressure in the feed ends of the roasting chambers, and means for regulating the sizes of the exits for the gases from the feed ends of the roasting chambers.

6. A roasting furnace having a plurality of independent superimposed roasting chambers provided with means for conveying material over the hearths thereof, a large equalizing chamber located at the discharge ends of and in communication with the roasting chambers, a baffle wall depending within the equalizing chamber to a point level with the lowermost roasting chamber, means for supplying gases heated by combustion and air under pressure to the equalizing chamber, means for inducing a minus pressure in the feed ends of the roasting chambers, devices for regulating the sizes of the passages between the equalizing chamber and the roasting chambers, and devices for regulating the sizes of exits for the gases from the feed ends of the said roasting chambers.

7. In roasting furnaces having a plurality of independent superimposed roasting chambers, a combustion chamber for burning fuel, an equalizing chamber located between and arranged in communication with the combustion chamber and the roasting chambers, means for passing and regulating the flow of air under pressure through and above the burning fuel in the combustion chamber to vary the temperature and oxygen content and pressure of the gases in the roasting chambers and means for controlling the flow of the uniformly heated gases through the roasting chambers.

8. In roasting furnaces having a plurality of independent superimposed roasting chambers having means for conveying material therethrough in the same direction, a combustion chamber adjacent to the discharge ends of the roasting chambers, a baffled equalizing chamber disposed interjacent the combustion chamber and the roasting chambers, an ignition arch in the combustion chamber and means for passing and regulating the flow of air below the grate and above the ignition arch in the combustion chamber.

9. In a roasting furnace having a plurality of superimposed independent roasting chambers, a series of hollow rabble shafts passing through the centre of the furnace, a firebox at the discharge ends of the roasting chambers, an equalizing chamber for the roasting gases disposed interjacent and in communication with the firebox and the roasting chambers a baffle wall depending within the equalizing chamber, a fan, a pipe connecting the upper ends of the rabble shafts to the fan, branch pipes passing from the fan to conduct the preheated air under pressure to points above and below the grate of the firebox, and valves for controlling the passage of air through the branch pipes.

10. In roasting furnaces the combination with the subject matter of claim 9 of an ignition arch located above the grate in the firebox, and means for delivering a regulatable supply of air to the firebox between the ignition arch and the roof of the combustion chamber of the firebox.

11. In roasting furnaces as claimed in claim 9, dampers at the discharge ends of the roasting chambers for regulating the flow of the roasting gases thereto, and valves for controlling the flow of gases from the feed ends of the roasting chambers.

12. In roasting furnaces having a plurality of independent superimposed roasting chambers provided with means for conveying material therethrough in the same direction, a combustion chamber adjacent to the discharge ends of the roasting chambers, an equalizing chamber disposed interjacent and in communication with the combustion chamber and the roasting chambers, an ignition arch in the combustion chamber, a fire bridge at the back of the combustion chamber, a baffle wall depending within the equalizing chamber to a point below the fire bridge and the lowermost roasting chamber, the discharge ends of the hearths of the roasting chambers projecting successively further in their order upward into an upcast from the equalizing chamber and means for controlling the flow of heated gases from the equalizing chamber through the openings of different sizes leading to the roasting chambers.

13. In roasting furnaces having a plurality of independent superimposed roasting chambers provided with means for conveying ore therethrough in the same direction, a combustion chamber, an equalizing chamber disposed interjacent and communicating with the combustion chamber and the roasting chambers a wall of the equalizing chamber passing downwardly adjacent to the discharge ends of the hearths of the roasting chambers, the discharge ends of said hearths projecting progressively nearer to the said wall in their order upward whereby the openings from the equalizing chamber for the flow of gas to the different hearths are reduced in size in their order upward.

14. In roasting furnaces, a plurality of independent superimposed roasting chambers having the discharge ends of their hearths in their order upward projecting progressively further into the path of upwardly moving heated gases, whereby the flow of the said gases to the roasting chambers in uniform or predetermined volume is facilitated.

15. In roasting furnaces having a plurality of independent superimposed roasting chambers, a hopper at the feed end of the furnace having its outer wall inclining downwardly and outwardly toward the bottom thereof, ports in the furnace wall for placing the roasting chambers in communication with the hopper, and means adapted to pass material from the hopper to each roasting chamber.

In testimony whereof he has affixed his signature in presence of two witnesses.

ARTHUR VICTOR LEGGO.

Witnesses:
 WILLIAM A. ASHTON,
 G. R. CULLEN.